United States Patent [19]

Vassallo et al.

[11] Patent Number: 4,583,772
[45] Date of Patent: * Apr. 22, 1986

[54] PIPE FITTING INTERLOCKING SYSTEM

[75] Inventors: Efrain D. Vassallo; Jose E. Valls, both of Ponce, P.R.

[73] Assignee: Vassallo Research & Development Corporation, Ponce, P.R.

[*] Notice: The portion of the term of this patent subsequent to Oct. 2, 2001 has been disclaimed.

[21] Appl. No.: 651,819

[22] Filed: Sep. 18, 1984

Related U.S. Application Data

[63] Continuation-in-part of Ser. No. 468,320, Feb. 22, 1983.

[51] Int. Cl.4 .............................. F16L 17/02
[52] U.S. Cl. ................... 285/347; 285/423; 285/DIG. 22
[58] Field of Search ............... 285/DIG. 22, 423, 260, 285/347, DIG. 7, 319, 379; 277/205, 206, 214

[56] References Cited

U.S. PATENT DOCUMENTS

| 166,735 | 8/1875 | Walworth | 285/DIG. 16 |
| 2,477,533 | 7/1949 | Whiting | 285/347 X |
| 2,507,535 | 5/1950 | Madsen | 285/DIG. 22 |
| 2,735,699 | 2/1956 | Chadbourne | 285/423 X |
| 2,871,031 | 1/1959 | Altemus et al. | 285/111 X |
| 3,784,235 | 1/1974 | Kessler | 285/DIG. 22 |
| 3,792,878 | 2/1974 | Freeman | 285/347 X |
| 3,860,270 | 1/1975 | Arnold | 285/DIG. 16 |
| 4,143,884 | 3/1978 | Nicholas et al. | 285/DIG. 22 |
| 4,474,392 | 10/1984 | Vassallo et al. | 285/347 |

FOREIGN PATENT DOCUMENTS

| 978055 | 12/1964 | United Kingdom | 285/347 |
| 1223276 | 2/1971 | United Kingdom | 285/DIG. 22 |

OTHER PUBLICATIONS

Vassallo Industries Catalog "Gask-o-Wek", Revised Nov. 1, 1978.

Primary Examiner—Dave W. Arola
Attorney, Agent, or Firm—Steele, Gould & Fried

[57] ABSTRACT

The pipe fitting interlocking system includes a central body of predetermined configuration, for example, ell, wye or tee shape of desired large diameter pipe size. The central body terminates at each of its ends in a lock junction to receive thereon in locked relationship an end hub member of the type suitable for receiving and interconnecting the spigot end of a section of plastic pipe. Each lock junction includes a shoulder upon which the end hub member is seated, an endwardly positioned lock and a circular, peripheral recess positioned between the shoulder and the lock. The end hub member includes a radially inwardly inclined projection to cooperate with and securely seat within the central body lock. A circular gasket is secured within the circular recess and biases against a portion of the inner periphery of the end hub to prevent leakage between the parts. The gasket includes a grooved base and a circular apex spaced from the base a sufficient distance to press and deform against an interior peripheral portion of a hub member.

4 Claims, 5 Drawing Figures

PIPE FITTING INTERLOCKING SYSTEM

RELATED APPLICATION

This application is a continuation-in-part of my co-pending application, Ser. No. 468,320, filed Feb. 22, 1983, entitled "Pipe Fitting Construction", now U.S. Pat. No. 4,474,392.

BACKGROUND OF THE INVENTION

1. Field of the Invention

The present invention relates generally to the field of plastic pipe fittings, and more particularly, is directed to an improved pipe fitting interlocking system including a novel interlocking and sealing construction.

2. Discussion of the Prior Art

In piping systems in general and in plastic piping systems in particular, it is the usual practice to provide sections of pipe in suitable increments, such as ten feet or twenty feet, for use in constructing a pipe line of a desired length. Each pipe section is fabricated to the designed internal diameter, usually by the extrusion process, and then has its ends worked as necessary to provide one bell or hub end and one spigot end of predetermined interrelating design to allow adjacent sections of pipe to be joined in a secure and leak proof manner.

In the usual manner, fittings such as ells, tees and wyes are employed in the piping system where design criteria require, and such fittings form the subject mater of the present invention. Fittings of smaller sizes are generally fabricated by molding for use with pipe sections of equal diameter. In the case of the large diameter work, the molding process cannot normally be economically employed and accordingly, it is the common practice to fabricate large diameter fittings of separate extruded plastic components and then to join the spearate parts together.

For example, when fabricating a wye fitting of twelve inch diameter, the central body in the configuration of the wye shape was first formed. At least some of the wye ends were then equipped with a separate bell or hub of suitable configuration to receive and seal against the spigot end of an interconnecting length of plastic pipe. In order to generate sufficient strength in each hub connection and to insure a leak proof fitting, a solvent weld or chemical junction was first formed between a hub and a free end of the wye central body. After all of the hubs were solvent welded in place, a second plastic weld or peripheral heat junction was then applied at each connected hub. These operations have proved to be time consuming, costly and subject to frequent quality control rejections. The pipe fitting interlocking system of the present invention seeks to overcome all of the problems inherent in the previous pipe fitting construction techniques.

As used herein, the term "large diameter" is defined to mean pipe and fitting diameters of ten inches, twelve inches and larger.

SUMMARY OF THE INVENTION

The present invention is directed to a plastic pipe fitting interlocking system comprising a central body arranged to receive on at least one end portion thereof a hub member for enabling a separate pipe section to be joined to said at least one end portion of the central body.

The end portion of the central body is provided with a lock junction means and the bore of the hub member is provided with means for interengaging to the lock junction means to provide a self-locking interconnection between the hub member the central body end portion. The hub member is formed with a bore diameter that is larger than the bore diameter of the end portion of the central body and is arranged to receive the said end portion therein. A novel type of seal is provided between the exterior of the end portion of the central body and the bore of the hub member by utilizing an annular gasket which is received in a peripheral groove in the exterior periphery of the end portion of the central body. The peripheral groove is spaced from the free end of the end portion, and the gasket is biased against the interior periphery of the hub member to provide a self-sealing interconnection. The gasket features a special, generally arch-shaped cross sectional configuration to assure a leakproof interconnection.

The plastic central body may be formed in usual manner to the desired configuration such as a wye or a tee having conventional predetermined inside diameter conforming to usual pipe sizes, for example, ten inches, twelve inches, fourteen inches, and the like. Each end portion to the central body is formed with a lock junction means to receive and lock thereon a hub member in a leakproof relationship. The hub members are preferably of usual hub design which may or may not include a peripheral groove and gasket seated therein for joining the spigot end of an adjacent section of pipe. Each hub member includes a circular, radially inwardly inclined projection means of suitable configuration to slide over and lock upon the end portion lock junction means to thereby provide a secure, self locking construction.

The lock junction means comprises generally a radially outwardly projecting shoulder which is spaced axially away from the free end of the end portion of the central body. A radially inwardly inclined, circular lock is formed in the end portion of the central body between the free end of the end portion and the projecting shoulder, to receive and lock thereon the cooperating circular, radially inwardly inclined projection means which projects radially inwardly in the associated hub member. A circular, radially outwardly open groove is formed in each central body end portion intermediate the radially outwardly projecting shoulder and the radially inwardly inclined lock. In the preferred embodiment, the groove is rectangular in cross sectional configuration to receive and firmly seat therein a specially designed resilient gasket for self-sealing arrangement between each end portion of central body and each respective associated hub.

The gasket employed may include a novel arch-shaped cross sectional configuration to enhance its self sealing capabilities. The gasket can be formed with a circular top apex of configuration and dimensions suitable to contact and be deformed against the interior periphery of the hub member to assure a trouble free and leakproof interconnection. The lock junction means and the cooperating radially inwardly inclined projection means provide a self locking and self sealing arrangement between the end portion of the central body and the hub member, and eliminate the need for additional operations upon assembly of the parts such as solvent sealing and heat welding.

Advantages of the above construction are that the central body and the hub members can be assembled without the need for solvent or plastic welding or chemical or heat sealing of the parts. Further, the central body and the hub members include self sealing and self locking cooperating construction features.

The plastic pipe fitting interlocking system of the present invention is simple in design, inexpensive in manufacture and trouble free when in use.

Features and advantages of the present invention will become apparent from the following detailed description of a preferred embodiment thereof given by example with reference to the accompanying drawings, in which.

DESCRIPTION OF THE PREFERRED EMBODIMENT OF THE INVENTION

Figure 1:
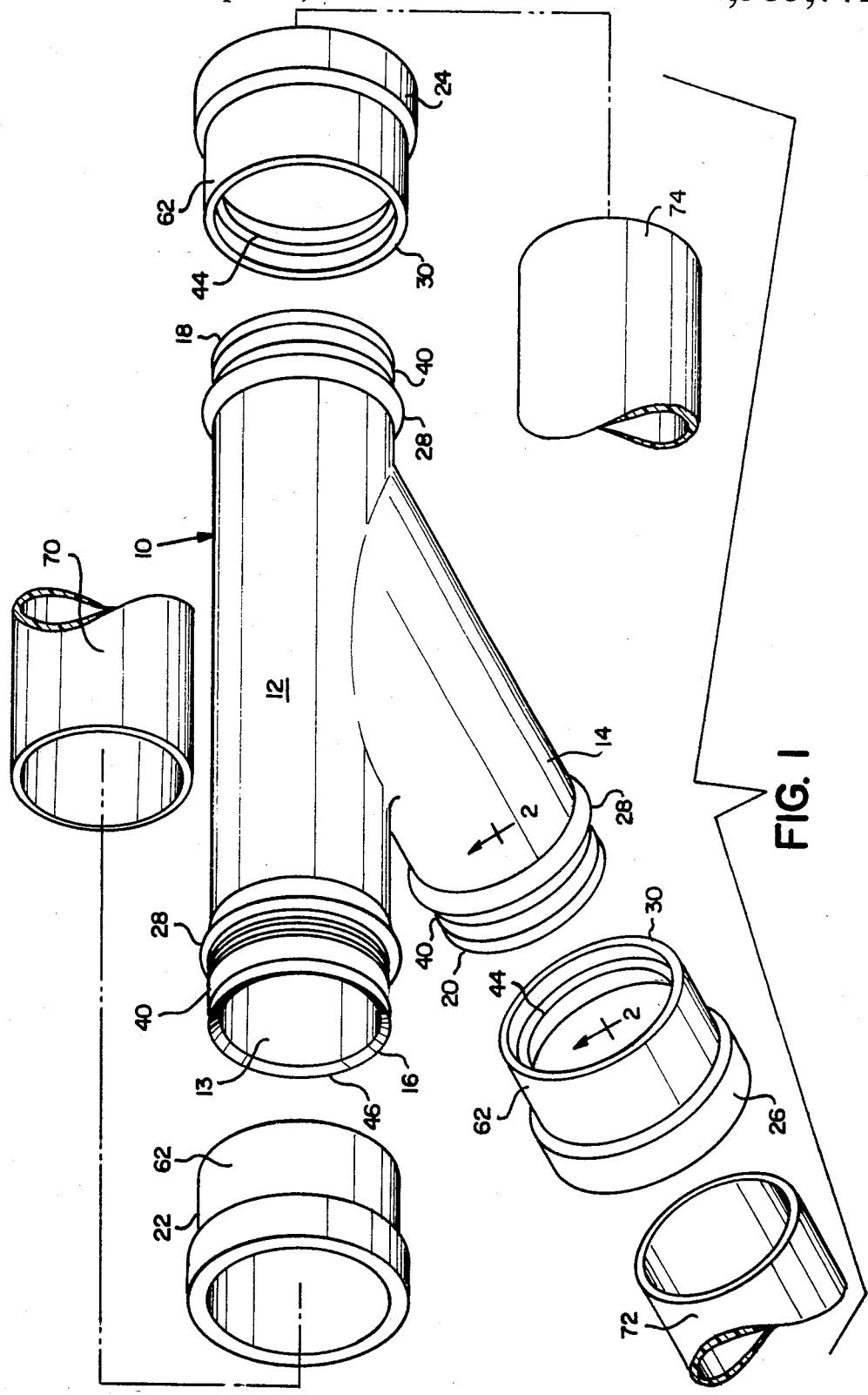
FIG. 1 is an exploded, perspective view of the plastic pipe fitting construction of the present invention with the ends of connected sections of pipe illustrated in exploded relationship.

Although specific terms are used in the following description for the sake of clarity, these terms are intended to refer only to the particular structure of the invention selected for illustration in the drawings and are not intended to define or limit the scope of the invention.

Referring now to the drawings, there is illustrated in FIG. 1 a plastic pipe fitting generally designated 10 of the type suitable for usual plastic pipe use, for example, drain lines 70, 72, 74. In the illustrative example, a wye fitting of twelve inch diameter will be described. However, it will be appreciated that large diameter fittings of larger or smaller diameter or of different configuration can be similarly constructed.

The fitting 10 comprises a central body 12 of desired configuration, such as the wye shape as illustrated. The central body 12 is formed with an in line conduit 13 and a branch conduit 14, which conduits include the fitting inlet end portions 16, 20 and fitting outlet end portion 18. Inlet hub members 22, 26 respectively overfit and join the central body 12 at the inlet end portions 16, 20. Similarly, an outlet hub member 24 overfits and joins the central body 12 at the fitting outlet end portion 18. It is the essence of this invention to provide a self locking and self sealing interconnection between the respective central body end portions 16, 18, 20 and the hub members 22, 24 and 26. As above set forth, the respective hub members 22, 24, 26 can be of any known configuration and design, either with or without an internal groove for seating a peripheral sealing gasket, as may be desired to interconnect the fitting 10 with conventional pipe sections 70, 72, 74 of a piping system.

Figure 2:
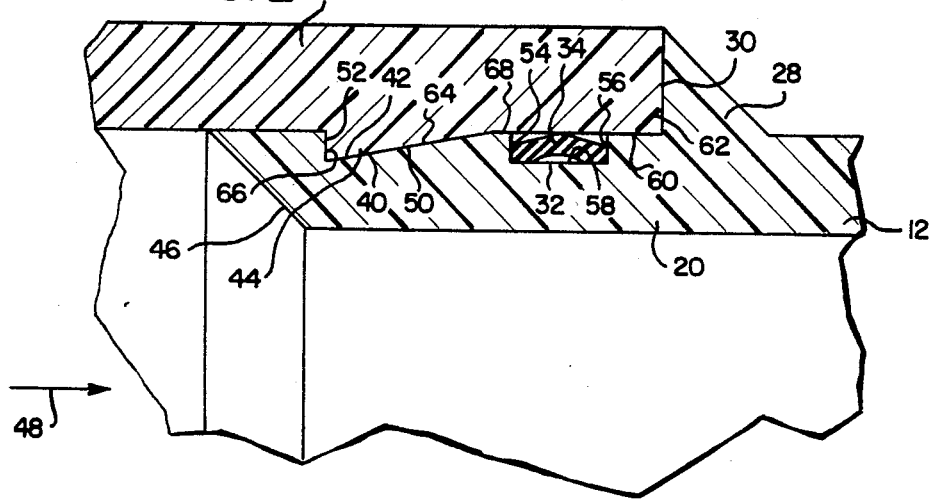
FIG. 2 is enlarged, partial, cross sectional view, taken along line 2—2 on FIG. 1. looking in the direction of the arrows.
Figure 3:
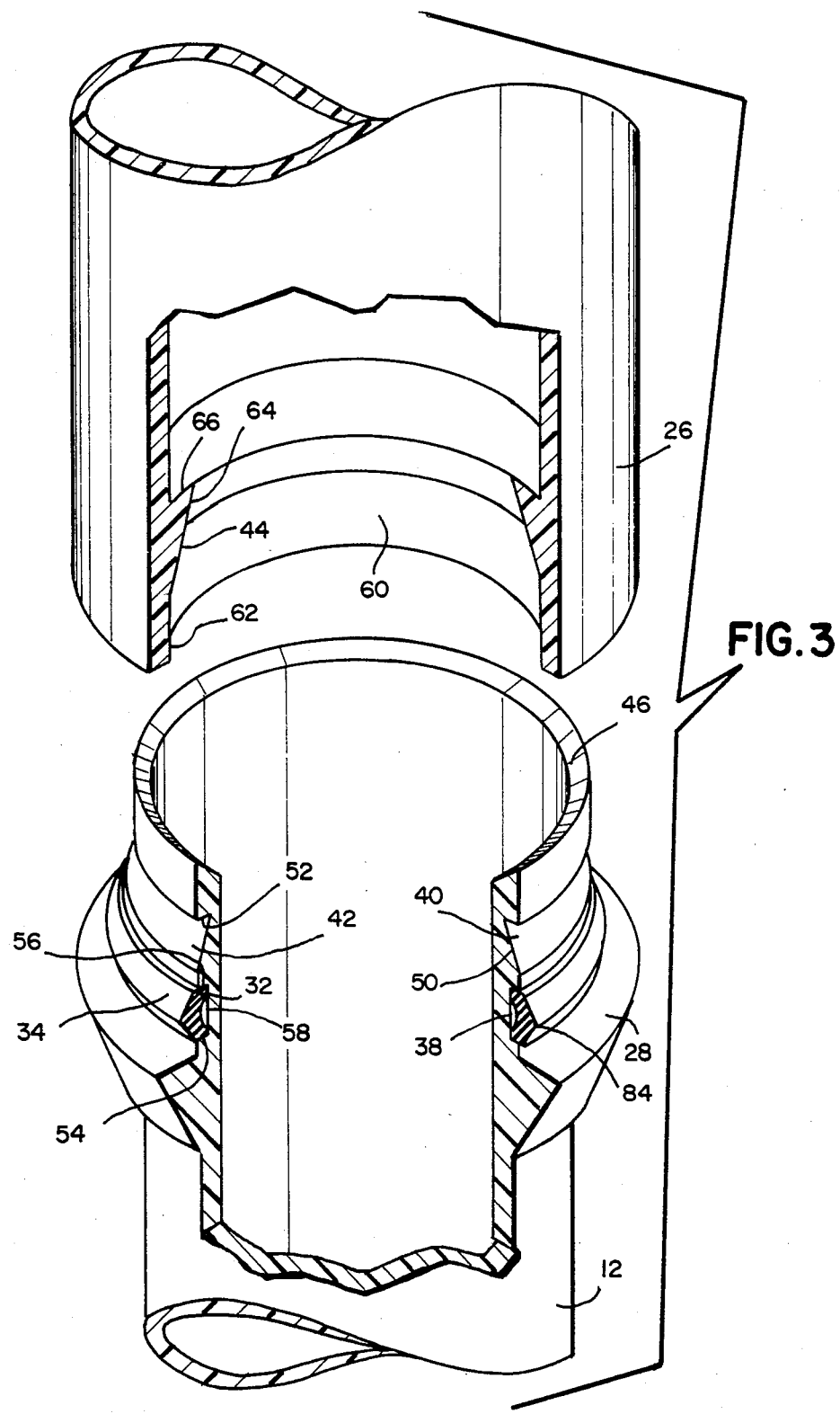
FIG. 3 is an enlarged, partial, exploded, perspective view of one locking junction and associated hub member, partially broken away to illustrate interior construction details.

Referring particularly to FIGS. 2 and 3, it will be seen that each end portion 16, 18, 20 of the central body 12 is molded or otherwise formed to provide a circular, radially outwardly extending shoulder 28. As best seen in FIGS. 1 and 2, each hub member 22, 24, 26 overfits its respective end portion 16, 18, 20 and is pressed inwardly until its inward end 30 rests upon and abuts against the shoulder 28. As illustrated, each shoulder 28 is spaced axially away from a free end 46 of the central body 12 and thus serves to set and limit the distance each hub member 22, 24, 26 overfits its respective end portion 16, 18, 20 as the fitting 10 is assembled.

Each end portion 16, 18, 20 is molded, machined or otherwise treated, by using known plastic pipe forming techniques; to provide a lock junction means 40 for automatically and securely receiving and affixing a respective hub member 22, 24, 26. The lock junction means 40 is axially spaced from the free end 46 and is positioned intermediate the free end 46 and the circular shoulder 28. The lock junction means 40 comprises a circular lock 42 which is defined by a circular, radially inwardly inclined side 50 and an abutting, circular, radially outwardly extending side 52. As best seen in FIG. 2, each end portion 16, 18, 20 is additionally provided with a radially outwardly open, circular groove or recess 32 which is positioned intermediate the shoulder 28 and the radially inwardly inclined side 50. Preferably, as shown, the circular groove 32 is formed with parallel sides 54,56 which extend at right angles from the recess bottom 58, to receive and securely seat the resilient gasket 34 therein.

Figure 4:
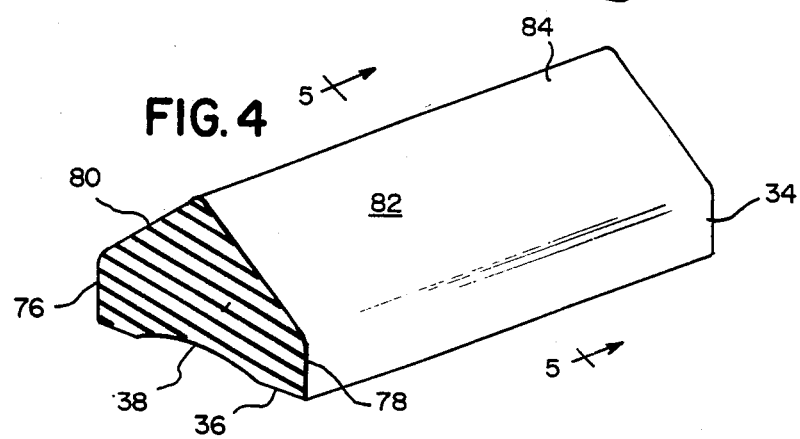
FIG. 4 is an enlarged, partial, perspective view of the fitting resilient gasket.
Figure 5:
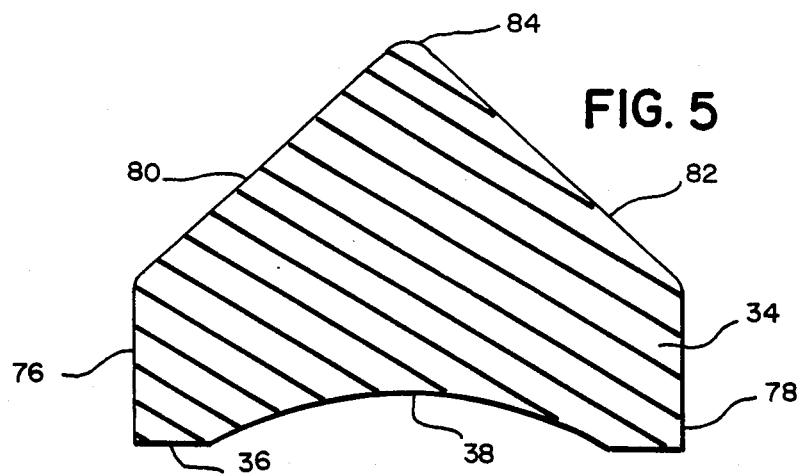
FIG. 5 is an enlarged, cross sectional view, taken along line 5—5 on FIG. 4, looking in the direction of the arrows.

Referring now to FIGS. 4 and 5, the resilient gasket 34 is formed of generally arch shaped configuration having a base 36 of cross sectional width to seat firmly upon the bottom 58 of the end portion circular recess or groove 32. An annular groove 38 is formed in the gasket base 36 to provide a bottom arch to enhance the sealing capabilities of the gasket by providing a spring-like quality to increase the bias of the gasket against the interior periphery of a hub member for sealing purposes. The gasket is shaped to a truncated triangular cross sectional configuration and as illustrated, is defined axially between parallel, spaced sidewalls 76,78. The inclined top walls 80,82 incline upwardly from the respective tops of the gasket sidewalls 76,78 and medially intersect to define a circular top 84. The top 84 may be a sharp apex as illustrated or may be more rounded. Preferably, the gasket is regularly formed and the apex is positioned medially above the sidewalls 76,78. As illustrated, the sidewalls 76,78 respectively extend upwardly at right angles from the opposite ends of the gasket base 36 to tightly seat within the end portion groove 32. In the illustrated embodiment, height of the gasket sidewalls 76,78 is less than the height of the groove sides 54,56 and the height of the apex 84 above the gasket base 36 is greater than the height of the groove sides.

Referring to FIGS. 2 and 3, each hub member 22, 24, 26 includes a hollow, cylindrically formed connecting end 62 of size to tightly overfit the outer periphery of its associated central body end 16, 18, 20. The hub member connecting end 62 terminates at the hub inward end 30 and is provided with a radially inwardly inclined inner projection means 44 of circular, arrow-like configuration to slip over the associated free end 46 of the central body and to lock within the central body circular lock 42. As illustrated, the radially inwardly inclined projection means 44 cooperates with and locks inside of the central body lock 42 to prevent disassociation of the hubs 22, 24, 26 from the central body 12 once the fitting 10 has been completely assembled.

Each radially inwardly inclined projection means or projection 44 includes an inclined side 64 of dimensions, position and inclination which are substantially identical to the dimensions, position and inclination of the corresponding inclined side 50 of the central body lock 42. Similarly, the projection comprises a radially inwardly extending side 66 and each radially inwardly extending side 66 is designed of dimensions and position which are substantially identical to the dimensions and position of the corresponding radially outwardly extending side 52 of the central body lock 42. The corresponsing radially extending sides 52, 66 engage and interlock, as best seen in FIG. 2, to prevent the hubs 22, 24, and 26 from being pulled or otherwise separated from the central body 12 once the fitting 10 has been assembled. Each free end 46 of the fitting central body 12 is preferably angularly formed to provide the least resistance to the flow of liquids (not shown) as they enter the fitting 10 in the direction indicated by the arrow 48.

In one configuration, the pipe section 12 was formed to a nominal twelve inch size having 12.5 inch outside diameter and wall thickness of 0.39 inches. The circular shoulders 28 were similarly dimensioned to project radially outwardly from the outer end portion periphery a distance of 0.39 inches, thereby to engage and receive thereon the connecting end 62 of a hub member 22, 24, 26. In this configuration, the hub members 22, 24, 26 were fabricated in usual manner with inside diameter of 12.5 inches whereby each hub member could be applied over a central body end portion 16, 18, 20 in a relatively tight engagement by applying axially directed forces as indicated by the arrow 48 and by utilizing the natural resiliency of the plastic materials of the central body and hub members.

The radially inwardly inclined, circularly projection 44 of each hub member was formed to project radially inwardly from the hub member interior periphery a maximum distance of 0.11 inches. Similarly, the circular lock 42 of the lock junction means was formed to extend radially inwardly from the end portion outer periphery a maximum distance of 0.11 inches and was formed to the same cross sectional configuration as the circular hub member projection 44. Accordingly, as each hub member was forced axially inwardly over its associated central body end portion, the circular projections 44 were forced into association within the respective locks 42. The plastic end portion and hub components deformed as necessary to make up the locked junction between the parts and then naturally returned to substantially the unstresed dimensions and shape after the projection 44 was fully seated within the associated lock 42.

In order to assemble the fitting 10 to provide a self locking and self sealing construction, all of the end portions 16, 18, 20 of the central body 12 are formed with the locking and sealing construction as shown in FIGS. 2 and 3. A circular, resilient gasket 34 is then seated within each end portion circular groove 32 with the gasket apex 84 projecting peripherally beyond the outer periphery 68 of the end portions 16, 18, 20. Each hub member connecting end 62 is formed with a radially inwardly inclined projection 44 for cooperation with a lock 42 provided in each end portion. The inner periphery 60 or bore of the hub member connecting end 62 is maintained to substantially the same diameter as the outer periphery 68 of each end portion 16, 18, 20 to assure a tight fit.

After the parts 12, 22, 24, 26 have been formed as illustrated, each hub member 22, 24, 26 is placed in axially aligned juxtaposition to its associated end portion 16, 18, 20 and then each hub member is urged axially over its respective associated end portion.. The natural resiliency of the plastic material comprising both the central body 12 and the hub members 22, 24, 16 allows sufficient movement or give by either or both parts by flexing the central body end portions 16, 18, 20 radially inwardly and the hub member connecting ends 62 radially outwardly to permit the hub member inward projection inclined side 64 to pass over the central body free end 46 sufficiently until the hub member projection 44 engages and fully seats within the end portion lock 42. In this postion, the hub member end 30 contacts in overall circular engagement the shoulder or stop 28. The natural memory of the plastic material forming the central body 12 and the hub members 22, 24, 26 functions to naturally and quickly return the parts to their designed configurations and dimensions after the projection 44 seats in the circular lock 42 to thereby tightly secure the parts together.

The annular groove or arch 38 that is formed in the gasket base 36 functions to provide a spring-like resiliency to the gasket in a manner to continuously bias the gasket circular apex radially outwardly away from the groove bottom 58. It is noteworthy that the height of the apex 84 above the gasket base is greater than the height of the circular groove sides 54,56 whereby the apex will be continuously biased against a circular portion of the inner periphery 60 of the connecting end 62 of each hub member 22, 24, 26. As best indicated in FIG. 2, the resilient gasket 34 will deform by compressing the apex 84 and by squeezing or compressing the annular groove 38 when the hub inner projection is seated or locked within the corresponding central body circular lock 42. The continuous squeezing or compressing of the gasket 34 when a hub member 22, 24, 26 is locked upon a central body end portion 16, 18, 20 creates outwardly directed reaction forces whereby the gasket forms a positive circular seal under all operating conditions. In this manner, a reliable, trouble free, self-sealing and self-locking pipe fitting interlocking system can be provided. The symmetrical configuration of the gasket provides for the application of balanced sealing forces of the gasket 34 against the interior periphery 60 hub member connecting ends 62.

Although the invention has been described with a certain degree of particularity, it is understood that the present disclosure has been made only by way of example and that numerous changes in the details of construction and the combination and arrangement of parts may be resorted to without departing from the spirit and scope of the invention. The scope of the invention should not be limited by the foregoing specification, but rather only by the scope of the claims appended hereto.

What is claimed is:

1. A plastic pipe fitting interlocking system comprising
a central body of predetermined configuration and comprising at least one end portion arranged to receive thereon a hub member for enabling a pipe section to be joined to said at least one end portion of the central body, the hub member having a bore; defining an inner periphery
the said at least one end portion terminating in a free end, the free end terminating in an end terminus and being an annulus of hollow cylindrical configuration defined between an interior peripheral wall surface and an exterior peripheral wall surface and having a longitudinal axis;

a lock junction means formed in the said at least one end portion in rearward longitudinal spaced relation from the end terminus to provide a self locking interconnection, the lock junction means comprising a circular lock which is defined in part by an inclined side, the inclined side being inclined circularly inwardly from the exterior peripheral wall surface toward the interior peripheral wall surface, the lock junction means having no adhesive, the lock junction means defining a forward cylindrical portion of the annulus forwardly of the circular lock, the lock junction means comprising a radially extending shoulder which outwardly projects from the central body exterior peripheral wall surface, the shoulder having a planar front surface and a rear surface which extends from said planar front surface to said external peripheral wall surface, the shoulder being rearwardly spaced from the rearward portion of the annulus;

a hub member connected to the said central body end portion at the lock junction means to provide an enlarged connector for receiving an adjacent length of pipe, the hub member having a connecting end circularly and outwardly adjacent to the central body end, the connecting end terminating in a planar end, the hub member connecting end comprising a circular, radially inward projection of configuration matching said circular lock to lock within the said circular lock without adhesive, the said shoulder being contacted by the hub member planar end when the circular inward projection of the hub member locks within the circular lock of the lock junction means;

a seal recess provided between the exterior periphery of the at least one end portion of the central body and the inner periphery of the hub member, the seal recess comprising a peripheral, rectangularly shaped circular groove provided in the central body end, the groove being rearwardly spaced from the lock junction means, the groove being defined by an annular flat bottom and parallel, spaced, forward and rearward, radially outwardly extending sides extending from the bottom, the said central body end defining a rearward cylindrical portion of the annulus rearwardly of the rear groove side, portions of the hub member connecting end overlying and contacting the said forward and rearward cylindrical portions of the annulus; and an annular resilient gasket seated within the groove to seal the connection between the hub member connecting end and the said central body free end, the gasket being biased against the said inner periphery of the hub member to provide a self-sealing interconnection, the gasket comprising an arched base only partly in contact with the bottom of the peripheral groove both before and after the hub member and the central body are interconnected, the gasket base comprising an annular arch and a circular top spaced from the base, the gasket being greater in height then the depth of the peripheral groove, the gasket top being pressed against and deformed against the inner periphery of the hub member bore.

2. A pipe fitting interlocking system according to claim 1 wherein the gasket is symmetrically formed.

3. A pipe fitting interlocking system according to claim 2 wherein the gasket is generally truncated triangularly shaped in cross sectional configuration, the gasket being defined by parallel, spaced sidewalls and upwardly inclined top walls extending from the sidewalls, each sidewall being respectively in overall face to face contact with a side of the groove.

4. A pipe fitting interlocking system according to claim 3 wherein the gasket top walls circularly intersect to form a sharp, circular apex, the height of the apex above the gasket being greater than the height of the groove sides.

* * * * *